(12) United States Patent
Ting (10) Patent No.: US 11,897,720 B2
(45) Date of Patent: Feb. 13, 2024

(54) FILAMENT SPOOL DRY BOX (71) Applicant: Chung-Wu Ting, New Taipei (TW)

(72) Inventor: Chung-Wu Ting, New Taipei (TW)

( * ) Notice: Subject to any disclaimer, the term of this patent is extended or adjusted under 35 U.S.C. 154(b) by 334 days.

(21) Appl. No.: 17/341,403

(22) Filed: Jun. 8, 2021

(65) Prior Publication Data

US 2022/0388804 A1 Dec. 8, 2022

(51) Int. Cl.
| | | |
|---|---|---|
| *B65H 49/32* | (2006.01) | |
| *B29C 64/118* | (2017.01) | |
| *B29C 64/255* | (2017.01) | |
| B33Y 40/10 | (2020.01) | |
| B33Y 30/00 | (2015.01) | |
| B33Y 40/00 | (2020.01) | |
| B29C 64/307 | (2017.01) | |

(52) U.S. Cl.
CPC .......... *B65H 49/322* (2013.01); *B29C 64/118* (2017.08); *B29C 64/255* (2017.08); *B29C 64/307* (2017.08); *B33Y 30/00* (2014.12); *B33Y 40/00* (2014.12); *B33Y 40/10* (2020.01)

(58) Field of Classification Search
CPC ... B65H 49/322; B29C 64/118; B29C 64/255; B29C 64/307; B33Y 30/00; B33Y 40/00; B33Y 40/10

USPC ........................................................ 425/182
See application file for complete search history.

(56) References Cited

U.S. PATENT DOCUMENTS

2001/0030383 A1* 10/2001 Swanson ................ B33Y 70/00
242/570
2013/0161442 A1* 6/2013 Mannella ............. B65H 49/322
118/46

* cited by examiner

*Primary Examiner* — Joseph S Del Sole
*Assistant Examiner* — Lawrence D. Hohenbrink, Jr.
(74) *Attorney, Agent, or Firm* — Winston Hsu (57) ABSTRACT

A filament spool dry box includes a shell, a dehumidifier and a sleeve component. The shell includes a hanging structure configured to allow a bracket to be disposed in for hanging the shell. The dehumidifier is disposed inside the shell. The sleeve component is rotatably disposed inside the shell and configured to allow a filament to be disposed on. A central axis of the hanging structure is offset from and above a central axis of the sleeve component. The filament spool dry box can isolate the filament from an external environment outside the shell and remove moisture from an internal environment inside the shell by the dehumidifier. Therefore, the filament spool dry box can prevent the filament inside the shell from absorbing moisture. Furthermore, the filament spool dry box can replace disposable spools in the prior art and be energy saving and environmental protecting.

20 Claims, 10 Drawing Sheets

FILAMENT SPOOL DRY BOX

BACKGROUND OF THE INVENTION

1. Field of the Invention

The present invention relates to a 3D printing peripheral device, and more particularly, to a filament spool dry box for a FDM/FFF (Fused Deposition Modeling/Fused Filament Fabrication) 3D printers.

2. Description of the Prior Art

A FDM/FFF 3D printer, using an additive manufacturing technique for rapid prototyping, is using filament to create a three-dimensional object by extruding a layer of material on top of the previous layer. The object can be made by using a number of printing materials, including PLA, PETG, ABS, PC, Nylon, etc., in filament form wound on an open spool. However, more or less, filaments often absorb moisture from the air easily due to their material properties, and the moisture in the filaments can contribute to a print failure, such as an unexpected pocket on the object when the moisture becomes steam and bubbles because of high temperature during extrusion. Therefore, it is important to prevent printing materials from absorbing moisture. And hence the requirement for a closed dry box in the market is increasing.

Furthermore, currently, the filament is wound on a disposable plastic spool. When the filament is used up, there is no recycle mechanism to reuse the spool, hence wasting resource. Besides, filament manufacturers are producing filaments using different spool specifications; hence there is no universal reusable spool to replace the disposable spool.

SUMMARY OF THE INVENTION

To solve the aforementioned problems, the present invention discloses a filament spool dry box including a shell, a dehumidifier and a sleeve component. The shell includes a hanging structure configured to allow a bracket to be disposed in for hanging the shell. The dehumidifier is disposed inside the shell. The sleeve component is rotatably disposed inside the shell and configured to allow a filament to be disposed on. A central axis of the hanging structure is offset from and above a central axis of the sleeve component.

In one embodiment, the hanging structure includes an upper guiding portion for cooperating with an upper arc-shaped portion of the sleeve component to guide a movement of the sleeve component.

In one embodiment, the filament spool dry box further includes at least one bearing component rotatably disposed inside the shell and for rotatably supporting the upper arc-shaped portion of the sleeve component.

In one embodiment, a cross section of the at least one bearing component is an internally tangent circle of a cross section of the sleeve component.

In one embodiment, the shell further includes a guiding structure. The guiding structure includes a lower guiding portion for cooperating with a lower arc-shaped portion of the sleeve component to guide a movement of the sleeve component.

In one embodiment, the shell further includes a first shell portion and a second shell portion detachably combined together. The first shell portion includes a first shell body, a first inner combining portion and a first supporting portion. The first inner combining portion protrudes from an inner periphery of the first shell body. The first supporting portion protrudes from the first shell body and is located adjacent to the first inner combining portion. The second shell portion includes a second shell body, a second inner combining portion and a second supporting portion. The second inner combining portion protrudes from an inner periphery of the second shell body. The second supporting portion protrudes from the second shell body and is located adjacent to the second inner combining portion. The first inner combining portion and the second inner combining portion cooperatively form the hanging structure. The first supporting portion and the second supporting portion cooperatively form the guiding structure, and the first inner combining portion is combined with the second inner combining portion in a sealing manner when the first shell portion is combined with the second shell portion.

In one embodiment, the first supporting portion is not completely attached with the second supporting portion when the first shell portion is combined with the second shell portion.

In one embodiment, the dehumidifier is disposed on the guiding structure.

In one embodiment, the filament spool dry box further includes a sealing assembly. The shell further includes a first shell portion and a second shell portion detachably combined together, and the sealing assembly is disposed between the first shell portion and the second shell portion.

In one embodiment, the sealing assembly includes an inner sealing component and an outer sealing component. The first shell portion includes a first inner combining portion and a first outer combining portion. The second shell portion includes a second inner combining portion and a second outer combining portion. The inner sealing component is disposed between the first inner combining portion and the second inner combining portion, and the outer sealing component is disposed between the first outer combining portion and the second outer combining portion.

In one embodiment, the shell further includes at least one discharge port. The outer sealing component includes at least one through hole structure disposed in the at least one discharge port and configured to allow the filament to pass through.

In one embodiment, the filament spool dry box further includes at least one insert disposed in the at least one through hole structure for reducing friction acting on the filament.

In one embodiment, the filament spool dry box further includes at least one engaging component. The shell further includes a first shell portion and a second shell portion detachably combined together, and the at least one engaging component is configured to engage with the first shell portion and the second shell portion.

In one embodiment, the first shell portion includes a first shell body, a first inner combining portion and a first outer combining portion. The first inner combining portion and the first outer combining portion respectively protrude from an inner periphery and an outer periphery of the first shell body. A combining surface of the first inner combining portion protrudes more than a combining surface of the first outer combining portion. The second shell portion includes a second shell body, a second inner combining portion and a second outer combining portion. The second inner combining portion and the second outer combining portion respectively protrude from an inner periphery and an outer periphery of the second shell body. A combining surface of the second inner combining portion protrudes more than a combining surface of the second outer combining portion.

The at least one engaging component is configured to engage with the first outer combining portion and the second outer combining portion, and the first shell portion and second shell portion are deformed by the at least one engaging component to generate a resilient force to drive the first inner combining portion and the second inner combining portion to be combined with each other tightly.

In one embodiment, the filament spool dry box further includes at least one release film disposed on at least one inner wall of the shell for reducing friction acting on the filament and/or the sleeve component.

In summary, in the present invention, the filament spool dry box can isolate the filament from an external environment outside the shell and remove moisture from an internal environment inside the shell by the dehumidifier. Therefore, the filament spool dry box can prevent the filament inside the shell from absorbing moisture. Furthermore, the filament spool dry box can be placed on a horizontal supporting surface, hung on the bracket, or mounted on a vertical wall according to different requirements of a 3D printer. Besides, the configuration that the central axis of the hanging structure is offset from and above the central axis of the sleeve component can prevent an excessive swinging movement of the hung shell driven by the rotated filament with gravity during extrusion of the filament when the shell is hung on the bracket.

Moreover, when the filament inside the shell is used up, a user can replenish a loose filament coil by detaching and attaching the first shell portion and the second shell portion. Therefore, the filament spool dry box can replace disposable spools stated in the prior art and be energy saving and environmental protecting.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", etc., is used with reference to the orientation of the Figure(s) being described.

The components of the present invention can be positioned in a number of different orientations. As such, the directional terminology is used for purposes of illustration and is in no way limiting. Accordingly, the drawings and descriptions will be regarded as illustrative in nature and not as restrictive.

As shown in FIG. 1 to FIG. 6, a filament spool dry box 1 includes a shell 11, a dehumidifier 12 and a sleeve component 13. The shell 11 includes a hanging structure 111, a stand structure 112 and a wall mount structure 113. The hanging structure 111 is configured to allow a bracket, which is not shown in the figures, to be disposed therein for hanging the shell 11 on the bracket, so that the filament spool dry box 1 can be hung on the bracket. The stand structure 112 is configured to support the shell 11 on a horizontal supporting surface, such as a desktop or a ground surface which is not shown in the figures, so that the filament spool dry box 1 can be placed near a targeted 3D printer. The wall mount structure 113 is configured to be attached on a matching wall mount component on a vertical wall, which is not shown in the figures, so that the filament spool dry box 1 can be mounted on the vertical wall. The dehumidifier 12 is disposed inside the shell 11, more specifically inside the sleeve component 13, and can be a desiccant dehumidifier or a thermo-electric dehumidifier. The sleeve component 13 is rotatably disposed inside the shell 11 and configured to allow a filament, which is not shown in the figures, to be disposed thereon. The shell 11 can isolate the filament from an external environment outside the shell 11. The dehumidifier 12 can remove moisture from an internal environment enclosed inside the shell 11. Therefore, the filament spool dry box 1 can prevent the filament from absorbing the moisture. Furthermore, a central axis of the hanging structure 111 is offset from and above a central axis of the sleeve component 13. Therefore, it prevents an excessive swinging movement of the shell 11 driven by the rotated filament on the sleeve component 13 with gravity during extrusion of the filament when the shell 11 is hung on the bracket.

Preferably, in this embodiment, the filament can be a loose filament coil without a disposable spool, and an outer diameter of the sleeve component 13 can be in accordance with a master-spool design. However, the present invention is not limited to this embodiment.

Figure 1:
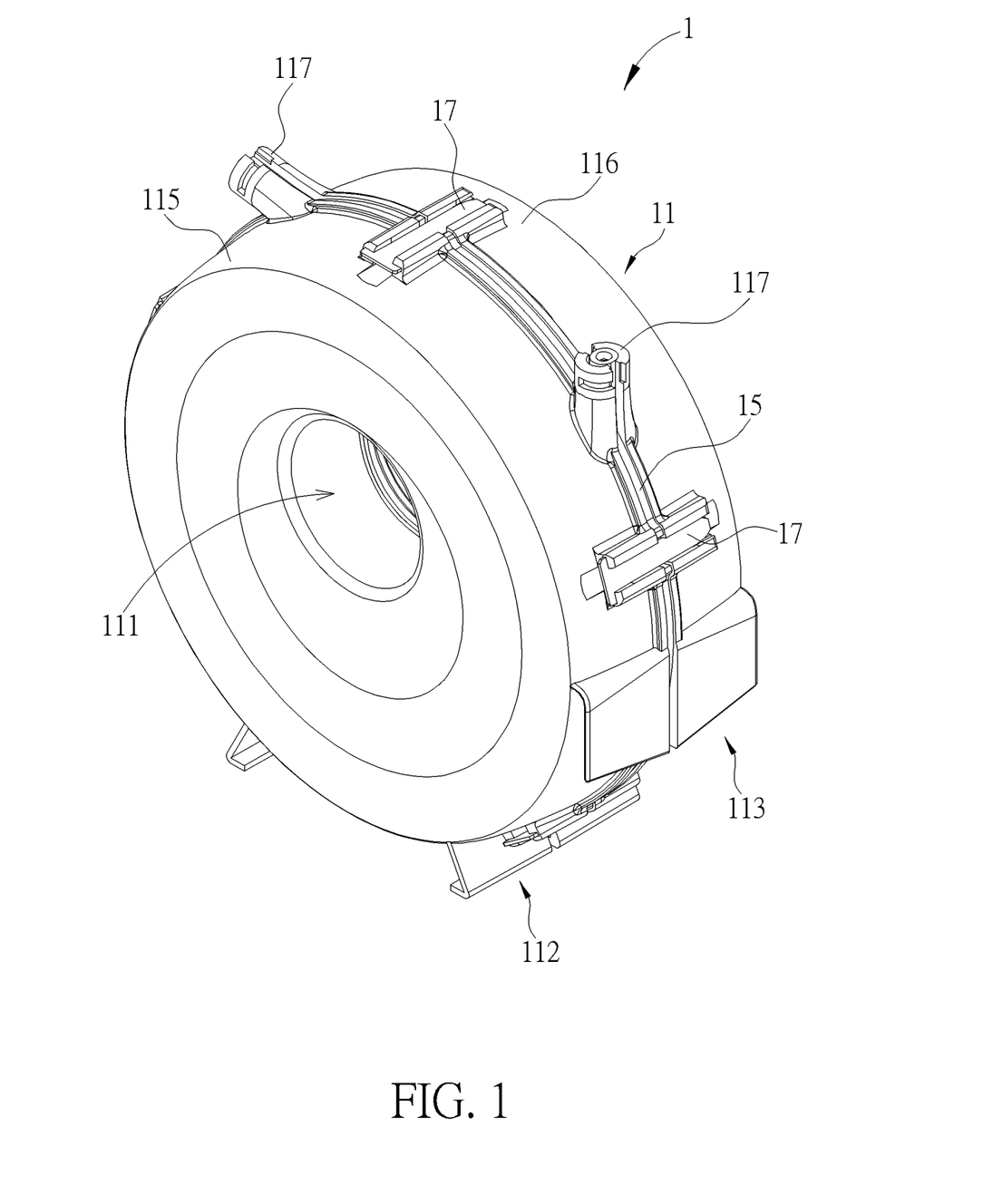
FIG. 1 to FIG. 3 are schematic diagrams of a filament spool dry box at different views according to an embodiment of the present invention.
Figure 2:
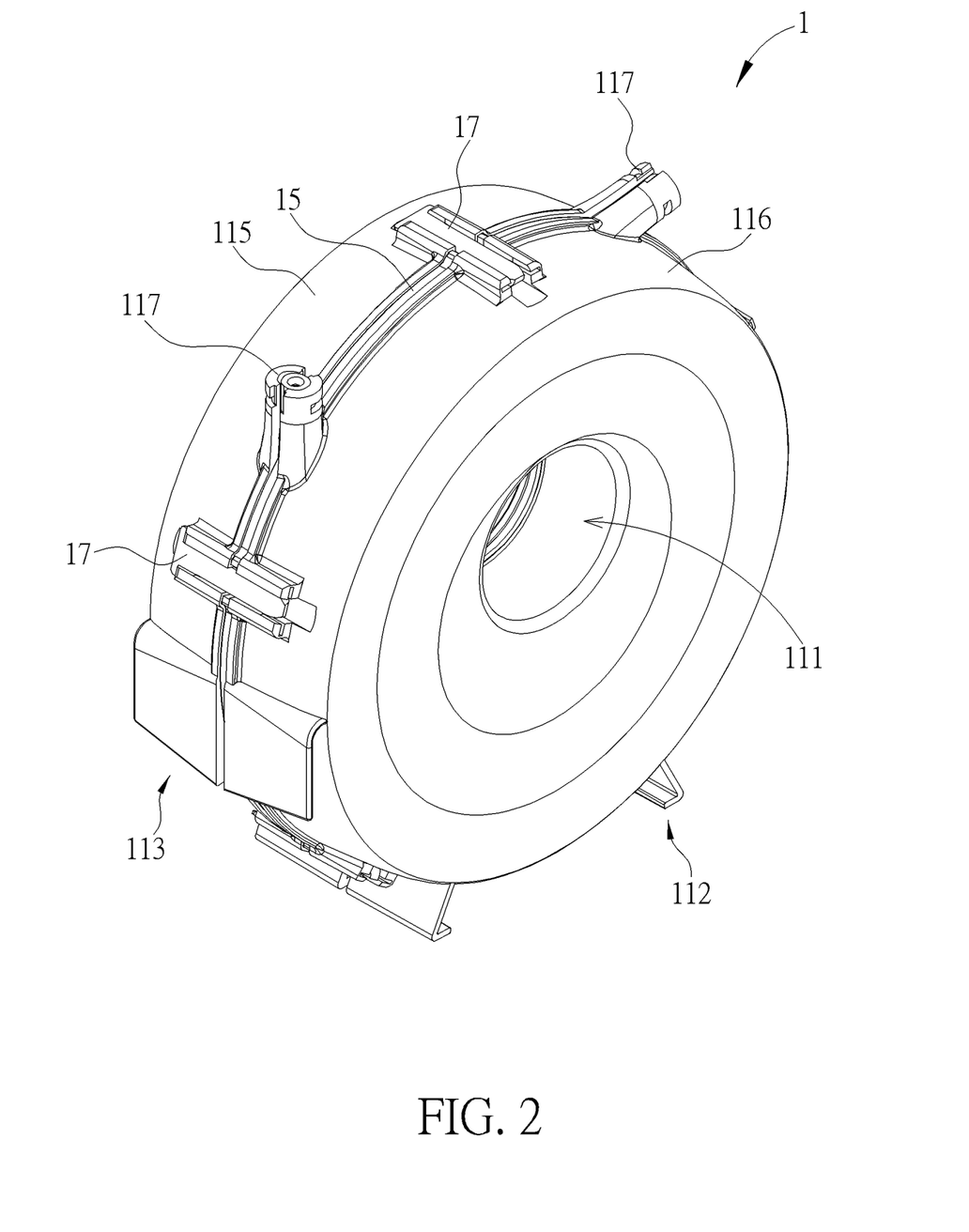
Figure 3:
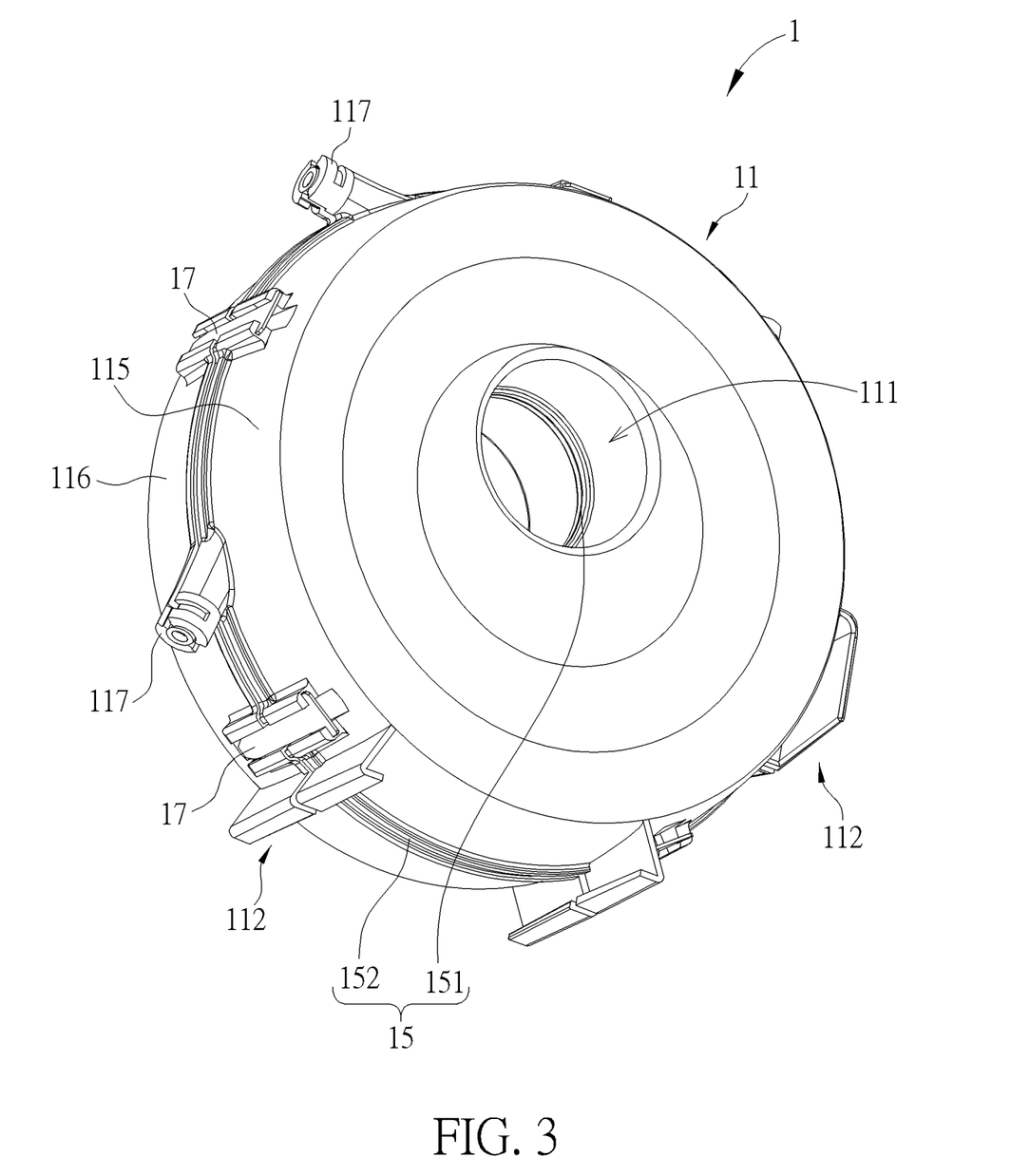
Figure 4:
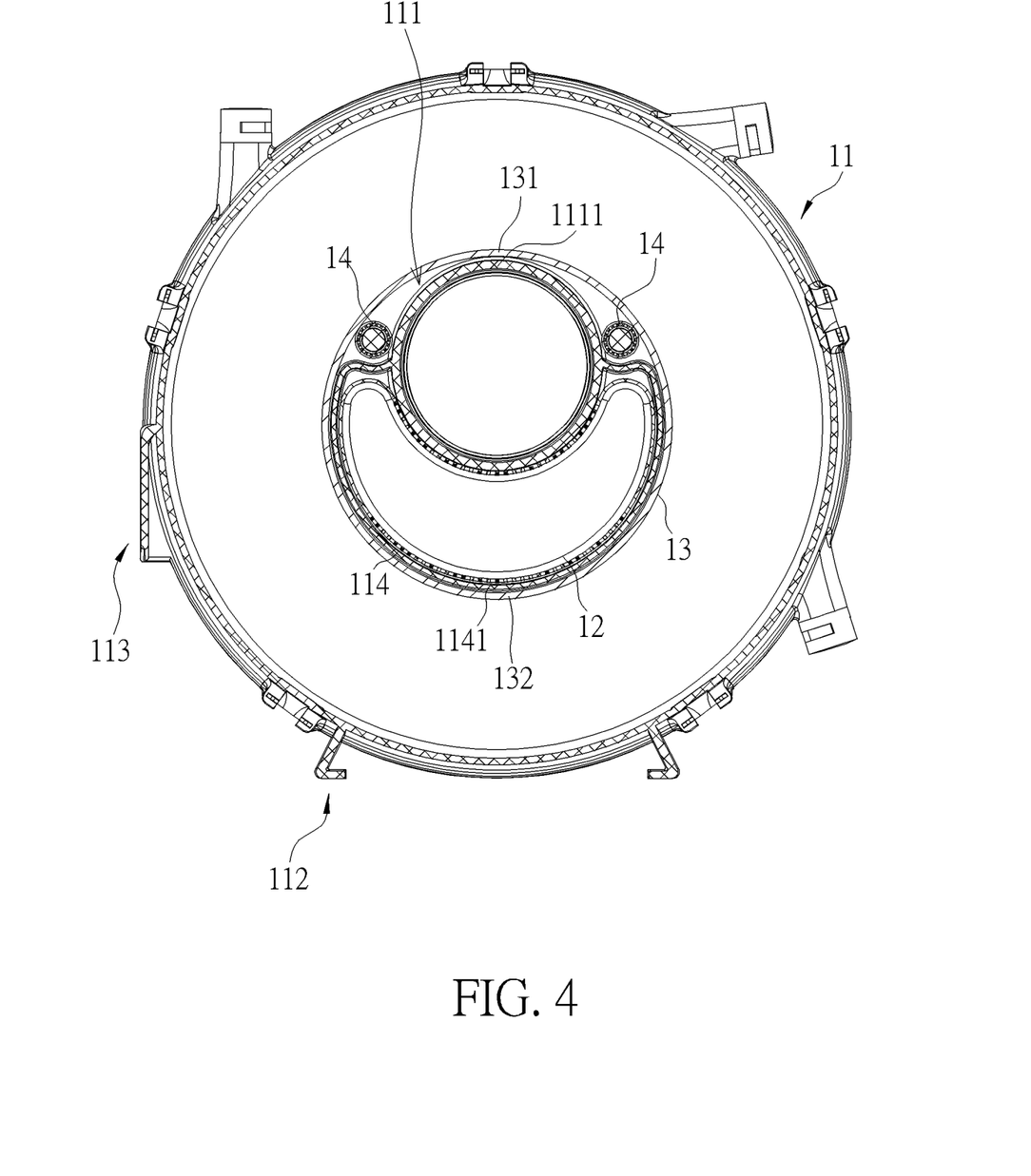
FIG. 4 is a partial sectional diagram of the filament spool dry box according to the embodiment of the present invention.
Figure 5:
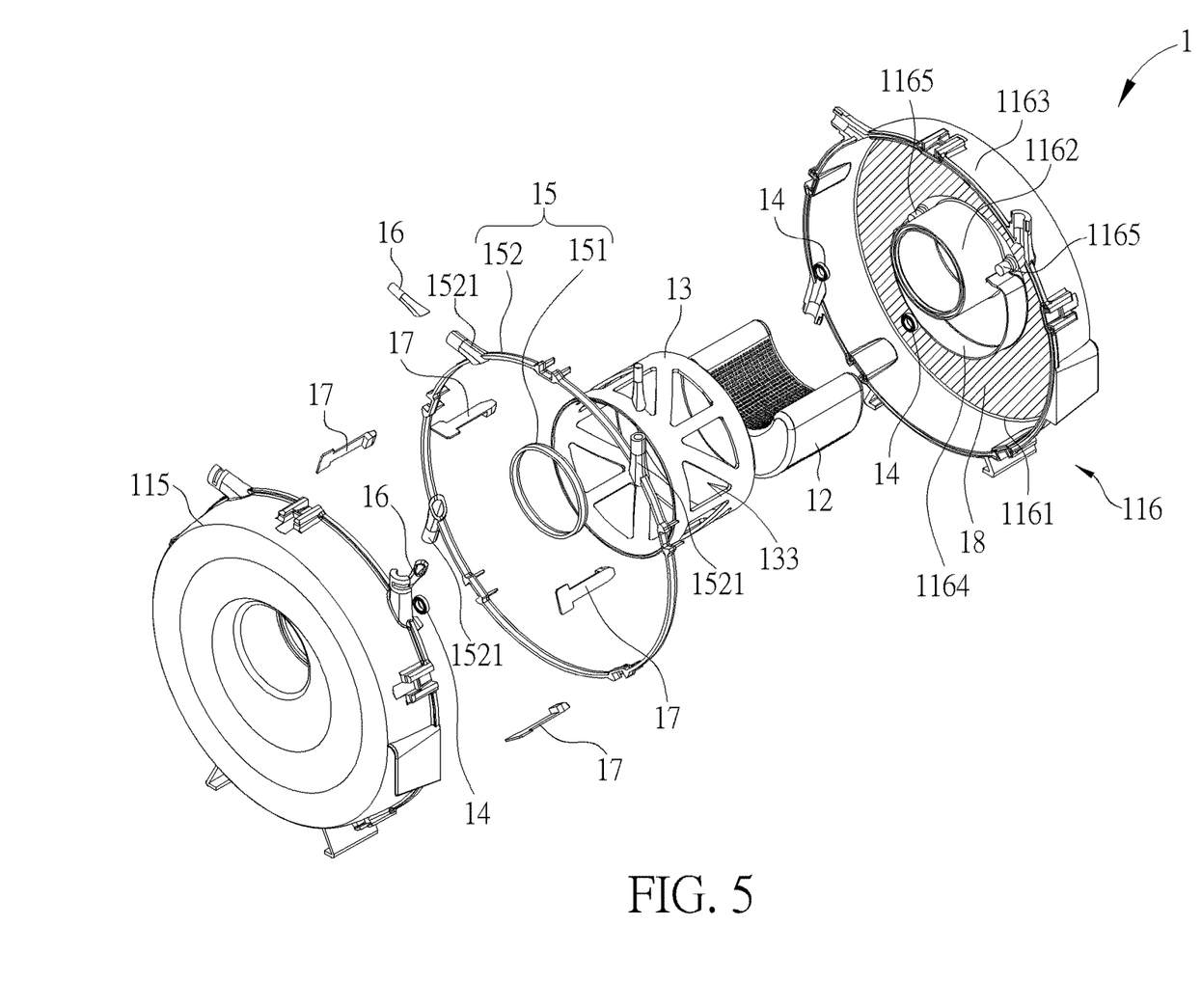
FIG. 5 and FIG. 6 are exploded diagrams of the filament spool dry box at different views according to the embodiment of the present invention.
Figure 6:
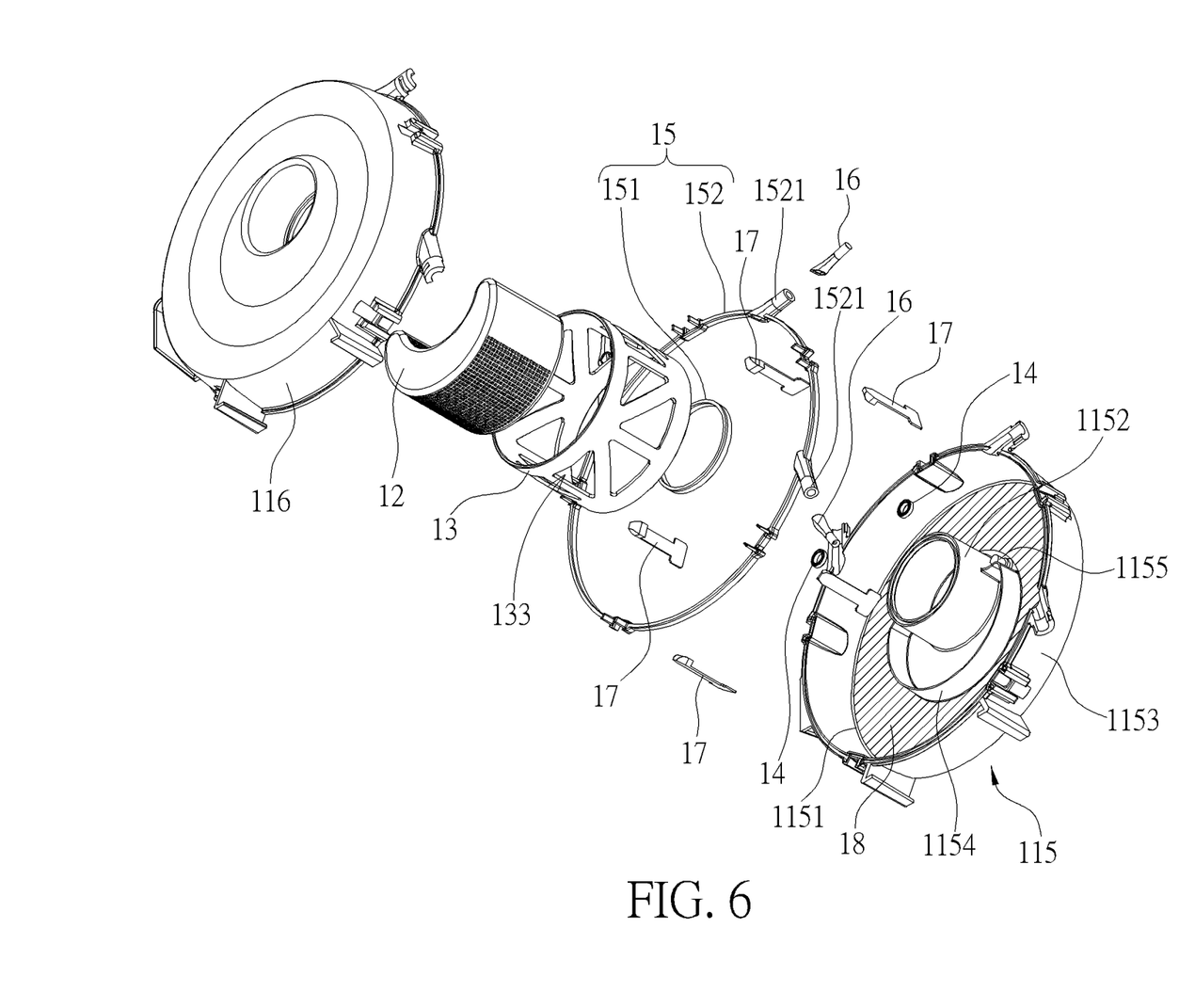

As shown in FIG. 4 to FIG. 6, in this embodiment, in order to make a rotating movement of the sleeve component 13 relative to the shell 11 smooth and stable, the hanging structure 111 can include an upper guiding portion 1111 for cooperating with an upper arc-shaped portion 131 of the sleeve component 13 to guide a rotating movement of the sleeve component. The filament spool dry box 1 further includes four bearing components 14 rotatably disposed inside the shell 11 and rotatably supporting the upper arc-shaped portion 131 of the sleeve component 13. Two of the four bearing components 14 are disposed on a right lateral side of the upper arc-shaped portion 131 of the sleeve component 13 and spaced from each other, and the other two of the four bearing components 14 are disposed on a left lateral side of the upper arc-shaped portion 131 of the sleeve component 13 and spaced from each other. A cross section of the sleeve component 13 is formed in a circular shape. A cross section of each of the bearing component is internally tangent circle of the cross section of the sleeve component 13. Besides, the shell 11 further can include a guiding structure 114 including a lower guiding portion 1141 for cooperating with a lower arc-shaped portion 132 of the sleeve component 13 to guide the rotating movement of the sleeve component 13. Preferably, the upper guiding portion 1111 and the lower guiding portion 1141 can be two arc-shaped structures. However, the present invention is not limited to this embodiment. For example, in another embodiment, the filament spool dry box can include only one bearing component rotatably supporting the lower arc-shaped portion of the sleeve component, and the cross section of the bearing component is an externally tangent circle of the cross section of the sleeve component. Alternatively, in another embodiment, the upper guiding portion or the lower guiding portion can be formed in another shape. Alternatively, in another embodiment, the upper guiding portion, the lower guiding portion and/or the bearing component can be omitted selectively.

Furthermore, as shown in FIG. 4 to FIG. 6, the dehumidifier 12 can be disposed on the guiding structure 114, and the sleeve component 13 can further include at least one aperture structure 133 for facilitating an air circulation inside the internal environment. However, the present invention is not limited to this embodiment. For example, in another embodiment, the dehumidifier can be disposed on a top portion or a bottom portion of the shell outside the guiding structure, and the sleeve component can have no aperture structure.

Specifically, as shown in FIG. 1 to FIG. 8, the shell 11 further includes a first shell portion 115 and a second shell portion 116 detachably combined together. The first shell portion 115 includes a first shell body 1151, a first inner combining portion 1152, a first outer combining portion 1153 and a first supporting portion 1154. The first inner combining portion 1152 and the first outer combining portion 1153 respectively protrude from an inner periphery and an outer periphery of the first shell body 1151. Two first positioning structures 1155 are formed on the first shell body 1151. The two first positioning structures 1155 are located adjacent to the first inner combining portion 1152 and located at two opposite sides of the first inner combining portion 1152 for mounting the two corresponding bearings 14. The first supporting portion 1154 protrudes from the first shell body 1151 and is located adjacent to the first inner combining portion 1152. The second shell portion 116 includes a second shell body 1161, a second inner combining portion 1162, a second outer combining portion 1163 and a second supporting portion 1164. The second inner combining portion 1162 and the second outer combining portion 1163 respectively protrude from an inner periphery and an outer periphery of the second shell body 1161. Two second positioning structures 1165 are formed on the second shell body 1161. The two second positioning structures 1165 are located adjacent to the second inner combining portion 1162 and located at two opposite sides of the second inner combining portion 1162 for mounting the other two corresponding bearings 14. The second supporting portion 1164 protrudes from the second shell body 1161 and is located adjacent to the second inner combining portion 1162. The first inner combining portion 1152 and the first outer combining portion 1153 can be directly or indirectly combined with the second inner combining portion 1162 and the second outer combining portion 1163 in sealing manners respectively when the first shell portion 115 is combined with the second shell portion 116. The first supporting portion 1154 is not attached with the second supporting portion 1164 for preventing from obstructing the air circulation inside the shell 11 to allow the dehumidifier 12 to function properly when the first shell portion 115 is combined with the second shell portion 116. The first inner combining portion 1152 and the second inner combining portion 1162 cooperatively form the hanging structure 111.

Figure 7:
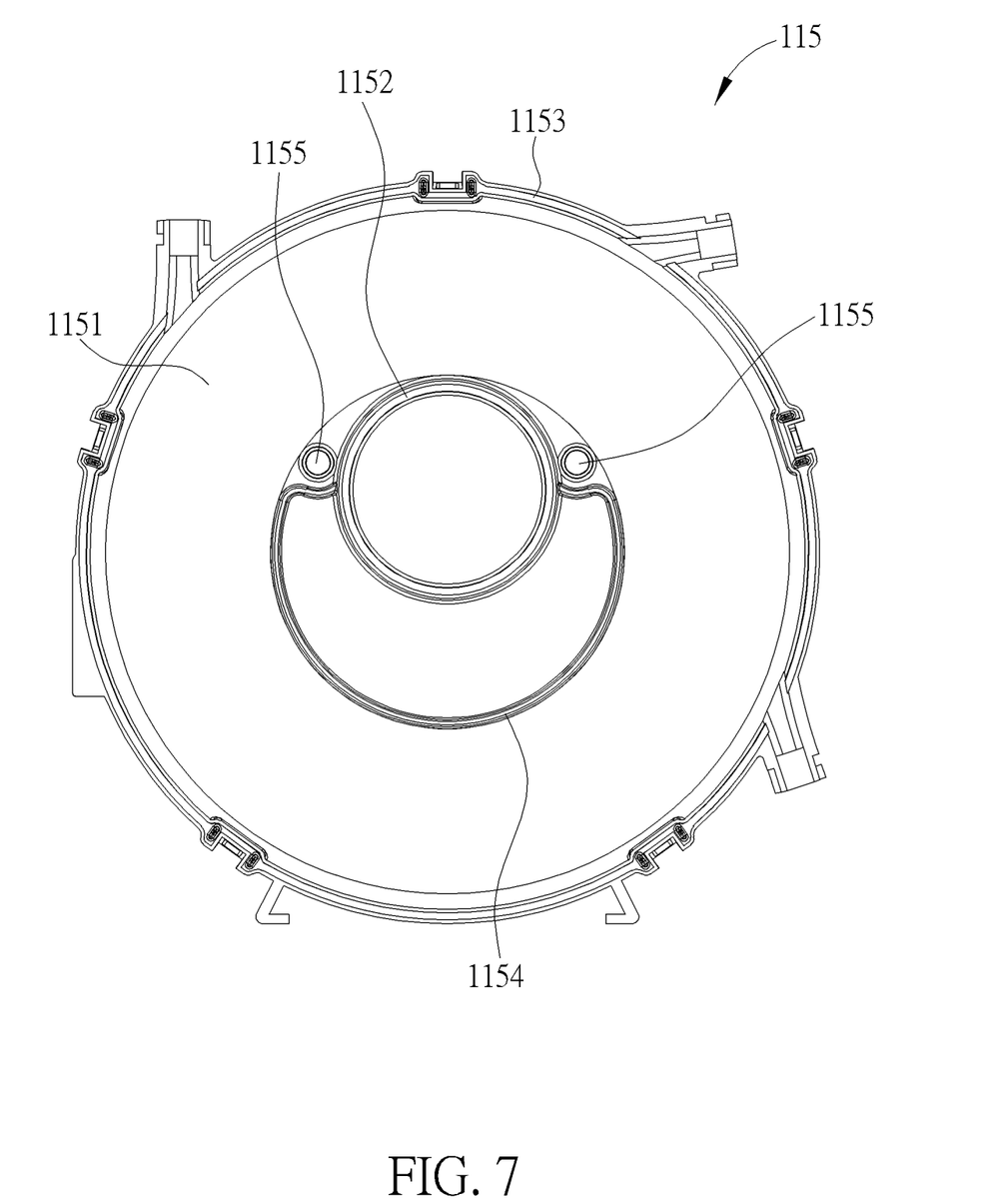
FIG. 7 is a diagram of a first shell portion according to the embodiment of the present invention.
Figure 8:
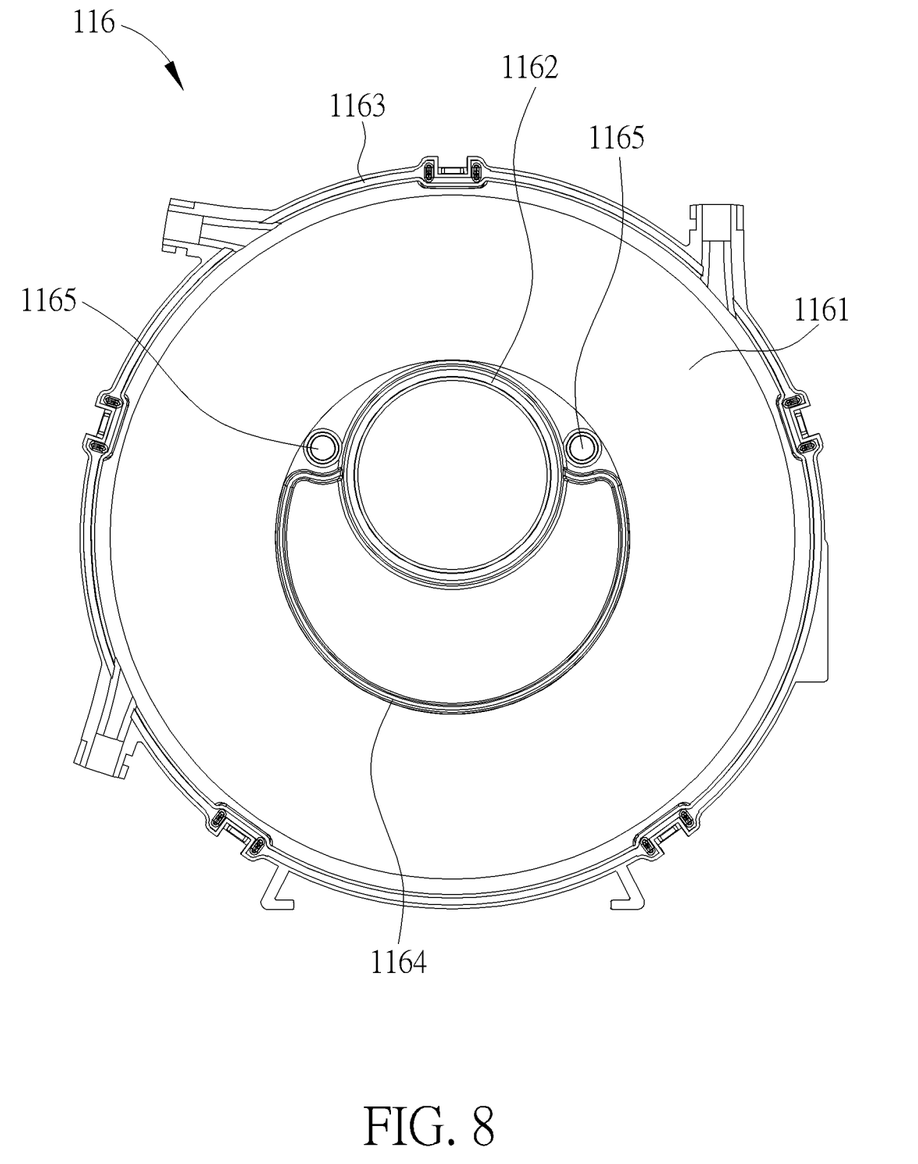
FIG. 8 is a diagram of a second shell portion according to the embodiment of the present invention.

The first supporting portion 1154 and the second supporting portion 1164 cooperatively form the guiding structure 114, i.e., the first supporting portion 1154 and the second supporting portion 1164 are located on a right lateral side and a left lateral side of the dehumidifier 12, and an outer portion of the first supporting portion 1154 adjacent to the sleeve component 13 and an outer portion of the second supporting portion 1164 adjacent to the sleeve component 13 cooperatively form the lower guiding portion 1141. However, the present invention is not limited to this embodiment. In another embodiment, a portion of the first supporting portion 1154 can be partially attached with a portion of the second supporting portion 1164.

Preferably, in this embodiment, the first shell portion 115 and the second shell portion 116 can be made of transparent material for easy observation of the filament. However, the present invention is not limited to this embodiment. For example, in another embodiment, the first shell portion or the second shell portion can be provided with a see-through window.

Moreover, as shown in FIG. 3 to FIG. 6, the filament spool dry box 1 further includes a sealing assembly 15 disposed between the first shell portion 115 and the second shell portion 116 and configured to prevent any communication between the internal environment and the external environment for preventing the moisture from flowing through. Specifically, the sealing assembly 15 includes an inner sealing component 151 disposed between the first inner combining portion 1152 and the second inner combining portion 1162, and an outer sealing component 152 disposed between the first outer combining portion 1153 and the second outer combining portion 1163. However, the present invention is not limited to this embodiment. For example, in another embodiment, there can be only one or none of the inner sealing component and the outer sealing component, leaving two corresponding combining portions abutting each other directly.

Besides, as shown in FIG. 1 to FIG. 6, the shell 11 further includes three discharge ports 117 at different orientations, so that the filament can be configured to be discharged via a proper one of the three discharge ports 117 according to different requirements of the 3D printer. The outer sealing component 152 includes three through hole structures 1521 respectively disposed in the three discharge ports 117 and configured to allow the filament to pass through. Preferably, the filament spool dry box 1 further includes three inserts 16 respectively disposed in the three through hole structures 1521 for reducing friction acting on the discharged filament, and the inserts 16 can have different inner diameters to fit different filament diameters. However, the present invention is not limited to this embodiment. For example, in another embodiment, the shell and the outer sealing component can include one discharge port and one through hole structure only, and the insert can be omitted. Furthermore, in this embodiment, the outer sealing component can be a one-piece structure. However, in another embodiment, the outer sealing component can include a plurality of sealing pieces separated from each other, i.e., neither the though hole structure nor the insert is provided, and the filament can be discharged by passing through a gap between the corresponding two sealing pieces and the corresponding discharge port.

In addition, as shown in FIG. 1 to FIG. 6, the filament spool dry box 1 further includes five engaging components 17 configured to tightly combine the first shell portion 115 with the second shell portion 116.

Specifically, as shown in FIG. 1 to FIG. 6 and FIG. 9 to FIG. 10, the five engaging components 17 are configured to engage with the first outer combining portion 1153 and the second outer combining portion 1163. A combining surface of the first inner combining portion 1152 protrudes more than a combining surface of the first outer combining portion 1153, and a combining surface of the second inner combining portion 1162 protrudes more than a combining surface of the second outer combining portion 1163. Such configuration allows the first shell portion 115 and the second shell portion 116 to be combined with each other tightly by the engaging components 17 only without any additional engaging component for the first inner combining portion 1152 and the second inner combining portion 1162. Preferably, each of the five engaging components 17 can be a latch, and the first shell portion 115 and the second shell portion 116 can be resiliently deformed by the engaging components 17 to generate a resilient force to drive the first inner combining portion 1152 and the second inner combining portion 1162 to be combined with each other tightly. By removing the five engaging components 17, the first shell portion 115 and the second shell portion 116 can be separated from each other easily for replenishment of the filament. However, the present invention is not limited to this embodiment. For example, in another embodiment, the filament spool dry box can include only one engaging component for engaging with the first outer combining portion and the second outer combining portion, or engaging with the first inner combining portion and the second inner combining portion. Alternatively, the filament spool dry box can include a plurality of engaging components for engaging with the first outer combining portion and the second outer combining portion and for engaging with the first inner combining portion and the second inner combining portion. Alternatively, the engaging component can be omitted, and the separation of the first shell portion and the second shell portion can be prevented by any other means, such as a fastening member or a screw member.

Figure 9:
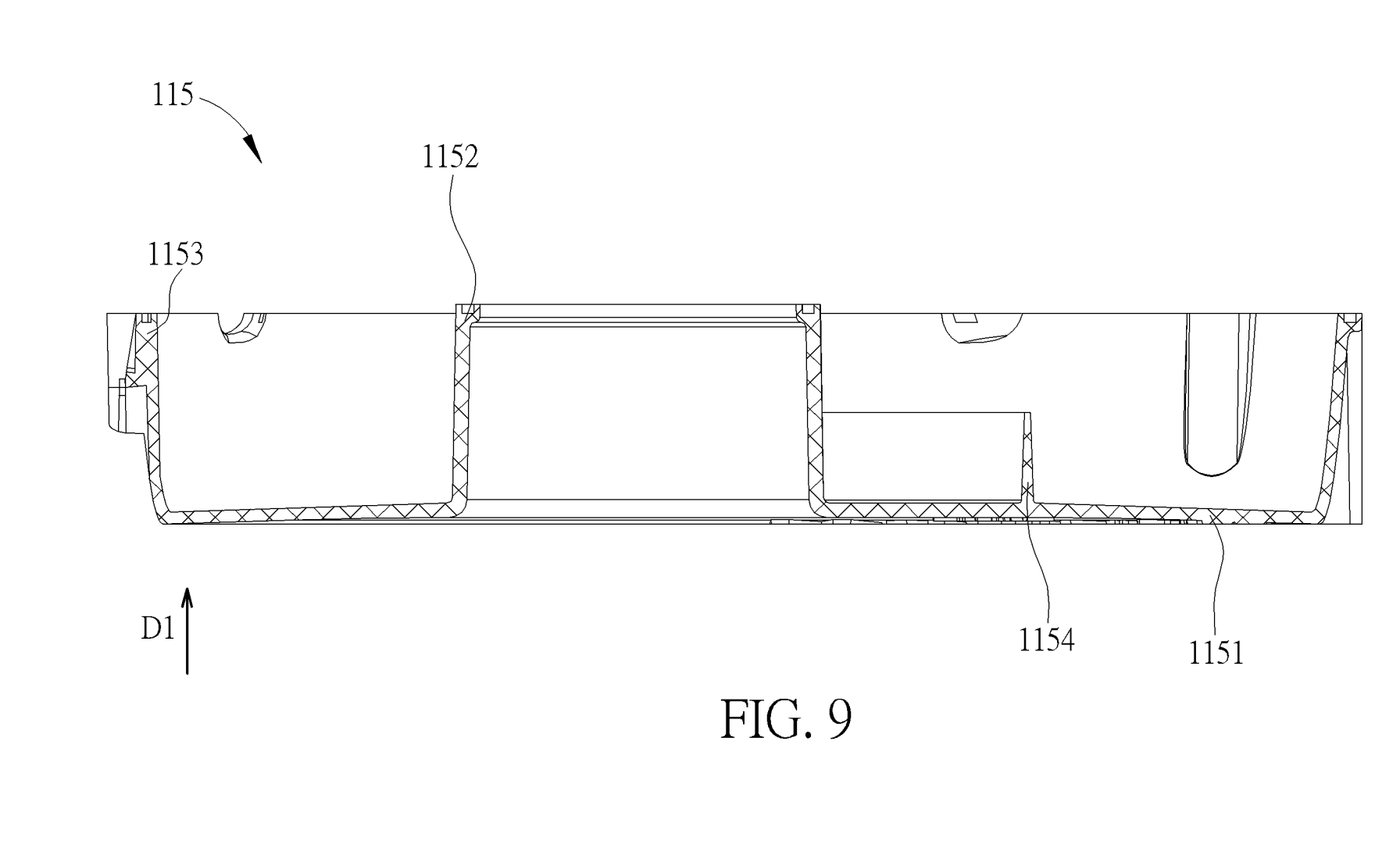
FIG. 9 is a sectional diagram of the first shell portion according to the embodiment of the present invention.
Figure 10:
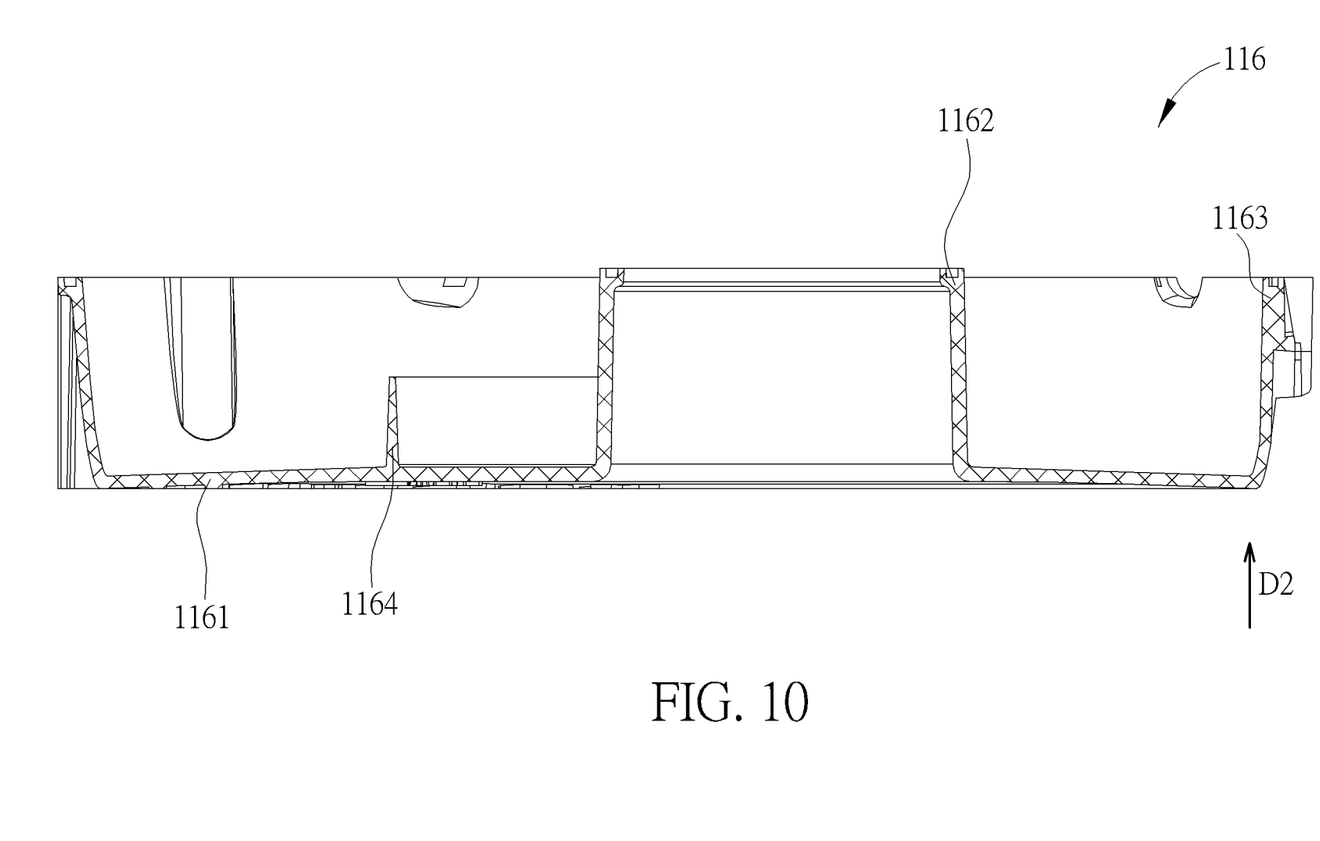
FIG. 10 is a sectional diagram of the second shell portion according to the embodiment of the present invention.

More specifically, as shown in FIG. 9 and FIG. 10, a protruding length of the first inner combining portion 1152 and a protruding length of the second inner combining portion 1162 can be respectively equal to a protruding length of the first outer combining portion 1153 and a protruding length of the second outer combining portion 1163, and the first shell body 1151 and the second shell body 1161 can be inward sloping structure, so that the combining surfaces of the first inner combining portion 1152 and the second inner combining portion 1162 can respectively protrude more than the combining surfaces of the first outer combining portion 1153 and the second outer combining portion 1163. The first shell body 1151 and the second shell body 1161 can be resiliently deformed along two opposite arrow directions D1, D2 when the first outer combining portion 1153 and the second outer combining portion 1163 are combined together by the engaging components 17. However, the present invention is not limited to this embodiment. For example, in another embodiment, the first shell body and the second shell body can have no slope, and the protruding lengths of the first inner combining portion and the second inner combining portion can be respectively greater than the protruding lengths of the first outer combining portion and the second outer combining portion, so the first shell body and the second shell body can also be resiliently deformed along two opposite arrow directions when the first outer combining portion and the second outer combining portion are combined together by the engaging components.

As shown in FIG. 5 and FIG. 6, the filament spool dry box 1 further includes two release films 18 disposed on an inner wall of the first shell body 1151 and an inner wall the second shell body 1161 facing toward each other. The two release films 18 can prevent the filament and/or the sleeve component 13 from contacting with the first shell body 1151 and the second shell body 1161 directly for reducing friction acting on the filament and/or the sleeve component 13, which makes the rotating movement of the filament and/or the sleeve component 13 smoother. However, the present invention is not limited to this embodiment. For example, in another embodiment, the release film can be omitted. Preferably, each of the release films 18 can be a release paper made of transparent material for easy observation of the filament. In another embodiment, the release film can be made of release material, e.g., PTFE, sprayed or coated on the inner walls of the first shell body and the second shell body to reduce friction.

In contrast to the prior art, in the present invention, the filament spool dry box can isolate the filament from the external environment outside the shell and remove moisture from the internal environment inside the shell by the dehumidifier. Therefore, the filament spool dry box can prevent the filament inside the shell from absorbing moisture. Furthermore, the filament spool dry box can be placed on a horizontal supporting surface, hung on the bracket, or mounted on a vertical wall according to different requirements of the 3D printer. Besides, the configuration that the central axis of the hanging structure is offset from and above the central axis of the sleeve component can prevent an excessive swinging movement of the hung shell driven by the rotated filament with gravity during extrusion of the filament when the shell is hung on the bracket.

Moreover, when the filament inside the shell is used up, a user can replenish a loose filament coil by detaching and attaching the first shell portion and the second shell portion. Therefore, the filament spool dry box can replace disposable spools stated in the prior art and be energy saving and environmental protecting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A filament spool dry box comprising:
    a shell comprising a hanging structure configured to allow a bracket to be disposed in for hanging the shell, wherein the shell further comprises a first shell portion and a second shell portion detachably combined together, the first shell portion comprises a first shell body and a first inner combining portion protruding from an inner periphery of the first shell body, the second shell portion comprises a second shell body and a second inner combining portion protruding from an inner periphery of the second shell body, and the first inner combining portion and the second inner combining portion cooperatively form the hanging structure;
    a dehumidifier disposed inside the shell; and
    a sleeve component rotatably disposed inside the shell and configured to allow a filament to be disposed on, a central axis of the hanging structure being offset from a central axis of the sleeve component.

2. The filament spool dry box of claim 1, wherein the hanging structure comprises an upper guiding portion for cooperating with an upper arc-shaped portion of the sleeve component to guide a movement of the sleeve component.

3. The filament spool dry box of claim 1, wherein the first inner combining portion is combined with the second inner combining portion in a sealing manner when the first shell portion is combined with the second shell portion.

4. The filament spool dry box of claim 2, further comprising at least one bearing component rotatably disposed inside the shell and for rotatably supporting the upper arc-shaped portion of the sleeve component.

5. The filament spool dry box of claim 4, wherein a cross section of the at least one bearing component is an internally tangent circle of a cross section of the sleeve component.

6. The filament spool dry box of claim 1, wherein the shell further comprises a guiding structure, the guiding structure comprises a lower guiding portion for cooperating with a lower arc-shaped portion of the sleeve component to guide a movement of the sleeve component.

7. The filament spool dry box of claim 6, wherein the first shell portion further comprises a first supporting portion protruding from the first shell body and located adjacent to the first inner combining portion, the second shell portion further comprises a second supporting portion protruding from the second shell body and located adjacent to the second inner combining portion, the first supporting portion and the second supporting portion cooperatively form the guiding structure, and the first inner combining portion is combined with the second inner combining portion in a sealing manner when the first shell portion is combined with the second shell portion.

8. The filament spool dry box of claim 7, wherein the first supporting portion is not completely attached with the second supporting portion when the first shell portion is combined with the second shell portion.

9. The filament spool dry box of claim 6, further comprising at least one bearing component rotatably disposed inside the shell and for rotatably supporting an upper arc-shaped portion of the sleeve component.

10. The filament spool dry box of claim 9, wherein a cross section of the at least one bearing component is an internally tangent circle of a cross section of the sleeve component.

11. The filament spool dry box of claim 6, wherein the dehumidifier is disposed on the guiding structure.

12. The filament spool dry box of claim 1, further comprising at least one bearing component rotatably disposed inside the shell and for rotatably supporting an upper arc-shaped portion of the sleeve component.

13. The filament spool dry box of claim 12, wherein a cross section of the at least one bearing component is an internally tangent circle of a cross section of the sleeve component.

14. The filament spool dry box of claim 1, further comprising a sealing assembly disposed between the first shell portion and the second shell portion.

15. The filament spool dry box of claim 14, wherein the sealing assembly comprises an inner sealing component and an outer sealing component, the first shell portion further comprises a first outer combining portion, the second shell portion further comprises a second outer combining portion, the inner sealing component is disposed between the first inner combining portion and the second inner combining portion, and the outer sealing component is disposed between the first outer combining portion and the second outer combining portion.

16. The filament spool dry box of claim 15, wherein the shell further comprises at least one discharge port, the outer sealing component comprises at least one through hole structure disposed in the at least one discharge port and configured to allow the filament to pass through.

17. The filament spool dry box of claim 16, further comprising at least one insert disposed in the at least one through hole structure for reducing friction acting on the filament.

18. The filament spool dry box of claim 1, further comprising at least one engaging component, and the at least one engaging component being configured to engage with the first shell portion and the second shell portion.

19. The filament spool dry box of claim 18, wherein the first shell portion further comprises a first outer combining portion protruding from an outer periphery of the first shell body, a combining surface of the first inner combining portion protrudes more than a combining surface of the first outer combining portion, the second shell portion further comprises a second outer combining portion protruding from an outer periphery of the second shell body, a combining surface of the second inner combining portion protrudes more than a combining surface of the second outer combining portion, the at least one engaging component is configured to engage with the first outer combining portion and the second outer combining portion, and the first shell portion and the second shell portion are deformed by the at least one engaging component to generate a resilient force to drive the first inner combining portion and the second inner combining portion to be combined with each other.

20. The filament spool dry box of claim 1, further comprising at least one release film disposed on at least one inner wall of the shell for reducing friction acting on the filament and/or the sleeve component.

* * * * *